United States Patent
Smith et al.

(10) Patent No.: US 6,292,614 B1
(45) Date of Patent: Sep. 18, 2001

(54) MOVABLE BRACKET FOR HOLDING INTERNAL COMPONENTS OF AN OPTICAL FIBER INTERCONNECTION CLOSURE DURING SERVICING AND ASSOCIATED METHOD

(75) Inventors: Kelly John Smith, Aledo; James H. Wicker, Arlington, both of TX (US)

(73) Assignee: Siecor Operations, LLC, Hickory, NC (US)

( * ) Notice: Subject to any disclaimer, the term of this patent is extended or adjusted under 35 U.S.C. 154(b) by 0 days.

(21) Appl. No.: 09/379,939

(22) Filed: Aug. 24, 1999

(51) Int. Cl.⁷ ........................................... G02B 6/00
(52) U.S. Cl. .................... 385/135; 385/134; 385/136; 385/137; 174/52.1
(58) Field of Search ................................ 385/134, 135, 385/136, 137; 174/52.1

(56) References Cited

U.S. PATENT DOCUMENTS

| | | |
|---|---|---|
| 4,581,480 | 4/1986 | Charlebois . |
| 4,666,240 | 5/1987 | Caron et al. . |
| 4,679,896 | 7/1987 | Krafcik et al. . |
| 4,685,764 | 8/1987 | Hoffer et al. . |
| 4,805,979 | 2/1989 | Bossard et al. . |
| 5,059,748 | 10/1991 | Allen et al. . |
| 5,071,220 | 12/1991 | Ruello et al. . |
| 5,097,529 | 3/1992 | Cobb et al. . |
| 5,131,066 | 7/1992 | Foss . |
| 5,185,845 | 2/1993 | Jones . |
| 5,208,428 | 5/1993 | Foss . |
| 5,235,134 | 8/1993 | Jaycox . |
| 5,278,933 | 1/1994 | Hunsinger et al. . |
| 5,323,480 | 6/1994 | Mullaney et al. . |
| 5,367,598 | * 11/1994 | Devenish, III et al. ............. 385/135 |
| 5,396,575 | 3/1995 | Hayward et al. . |
| 5,440,666 | 8/1995 | Burek et al. . |
| 5,450,518 | 9/1995 | Burek et al. . |

(List continued on next page.)

OTHER PUBLICATIONS

Siecor, Splice Closures, SHD–10, Sep. 1995, 4 pages.
Siecor, Metal Splice Trays, Siecor Recommended Procedure, SRP–001–274, Issue 3, Jan. 1998, pp. 1–4.
Siecor, FiberManager™ System Access Provisioning Facility (APF), ICH–137, Dec. 1995, 4 pages.
Siecor, Patch Closure, FTL–3A, Oct. 1996, 2 pages.
Siecor, SCF–4C18 Canister Splice Closure, Siecor Recommended Procedure, SRP–003–512, Issue 1, Feb. 1999, pp. 1–15.

(List continued on next page.)

Primary Examiner—Hemang Sanghavi
Assistant Examiner—Sung Pak

(57) ABSTRACT

A closure that is operative for containing optical fiber splices includes a support assembly that supports the splices. While the closure is in an enclosed configuration, the support assembly and a holding bracket are substantially contained in a housing of the closure. When the splices within the closure are to be serviced, the support assembly and the holding bracket are removed from the housing. Thereafter, the holding bracket is configured so a protruding portion of the holding bracket extends away from the support assembly to provide an extended configuration. While in the extended configuration, the protruding portion of the holding bracket is clamped to a work surface with a clamping device so the holding bracket supports the support assembly in a cantilever-like fashion and the holding bracket and the clamping device do not substantially interfere with the servicing of the optical fiber splices. After servicing the splices, the holding bracket is configured in an unextended configuration and the support assembly, with the holding bracket attached thereto, is returned to the housing, so the holding bracket is readily available for use the next time the closure is serviced.

30 Claims, 7 Drawing Sheets

U.S. PATENT DOCUMENTS

| | | |
|---|---|---|
| 5,472,160 | 12/1995 | Burek et al. . |
| 5,479,553 | 12/1995 | Daems et al. . |
| 5,495,549 | 2/1996 | Schneider et al. . |
| 5,509,099 | 4/1996 | Hermsen et al. . |
| 5,619,608 | 4/1997 | Foss et al. . |
| 5,631,993 | 5/1997 | Cloud et al. . |
| 5,644,671 | 7/1997 | Goetter et al. . |
| 5,692,299 | 12/1997 | Daems et al. . |
| 5,862,290 | 1/1999 | Burek et al. . |
| 6,081,644 * | 6/2000 | Stateczny et al. .................. 385/135 |

OTHER PUBLICATIONS

Siecor, Installation Instructions for the Siecor SCN–CAN Canister Splice Closure (w/Grommets), Siecor Recommended Procedure, SRP–003–104; Issue 7, Sep. 1998, pp. 1–14.

Siecor, SCN–CAN Canister Splice Closure, Siecor Recommended Procedure, SRP 003–255, Issue 8, Sep. 1998, pp. 1–16.

Siecor, SCN–RCAN Canister Splice Closure (Field (Drilled End Cap)), Siecor Recommended Procedure, SRP–003–319, Issue 5, Sep. 1998, pp. 1–13.

Siecor, SCN–RCAN Canister Splice Closure (Pre–Drilled), Siecor Recommended Procedure, SRP–003–320, Issue 4, Sep. 1998, pp. 1–12.

Siecor, SCF–6C22 and SCF–6C28 Canister Splice Closure, Siecor Recommended Procedure, SRP–003–485, Issue 1, Oct. 1998, pp. 1–15.

* cited by examiner

MOVABLE BRACKET FOR HOLDING INTERNAL COMPONENTS OF AN OPTICAL FIBER INTERCONNECTION CLOSURE DURING SERVICING AND ASSOCIATED METHOD

FIELD OF THE INVENTION

The present invention relates generally to optical fiber interconnection closures and, more particularly, to methods and apparatus for holding internal components of a splice closure during servicing.

BACKGROUND OF THE INVENTION

Fiber optic networks typically include interconnection closures at various splice locations throughout the fiber optic network. Typically, these interconnection closures include splice closures and patch closures. For example, splice closures commonly house the splices connecting the optical fibers of one or more distribution cables to respective ones of the optical fibers of a fiber optic feeder cable. By housing the splices, a splice closure protects the spliced end portions of the optical fibers from environmental degradation, strain, and other deleterious forces, thereby increasing the reliability and quality of the splices.

As known to those of ordinary skill in the art, a variety of splice closures have been designed. For example, a typical butt-type splice closure includes a housing open at one end and a single end cap positioned within the open end of the housing. Each of the fiber optic cables associated with the butt-type splice closure extends through the single end cap. In addition, in-line splice closures include a housing open at both of its opposite ends and a pair of end caps respectively positioned within the open ends of the housing so fiber optic cables can enter the in-line splice closure from either end of the housing.

Conventional splice closures of the above-described types generally include a frame that is connected to the end cap(s) and carries a number of splice trays that are disposed in a stacked arrangement within the housing. Each splice tray generally includes a series of splice holders for receiving the spliced end portions of a pair of optical fibers.

When servicing a splice closure, the end cap(s), as well as the frame and components attached thereto, are removed from the housing. Thereafter, it is common to secure the frame to a work surface, such as a workbench or the top of a table. In the furtherance of the securing, it is common to use a C-clamp, or another type of clamp, to clamp the frame at a position adjacent to the end cap. However, it is often inefficient to apply a clamp to the frame at that or another position because the size of the frame is limited and the attached clamp can restrict access to the optic cables, fibers, and splices. In addition, carrying a clamp to and from the site at which a splice closure is being serviced, for the purpose of securing the frame of the splice closure to a work surface, can be an inconvenience.

SUMMARY OF THE INVENTION

The present invention solves the above problems, and other problems, by providing apparatus and methods for efficiently and securely holding internal components of a splice closure during servicing. More specifically, in accordance with one aspect of the present invention, a closure that contains optical fiber splices includes a holding bracket and a support assembly. The support assembly supports the splices. The support assembly and the holding bracket can be disposed either in an enclosed configuration or an unenclosed configuration. In the enclosed configuration, the housing substantially contains both the support assembly and the holding bracket. In the unenclosed configuration, both the support assembly and the holding bracket are separated from the housing. The holding bracket is movable relative to the support assembly and operative for securely holding the support assembly during the unenclosed configuration. When the transition is made from the enclosed configuration to the unenclosed configuration, both the support assembly and the holding bracket are removed from the housing. Thereafter and during the unenclosed configuration, the holding bracket is manually configured so a protruding portion of the holding bracket extends away from the support assembly to provide an extended configuration. While in the extended configuration, the protruding portion of the holding bracket is clamped to a work surface with a clamping device to provide a clamped configuration. The holding bracket is constructed so that during the clamped configuration the holding bracket supports the support assembly in a cantilever-like fashion and the holding bracket and the clamping device do not substantially inhibit access to the optical fiber splices and associated optical fibers and cables.

The holding bracket can be configured to extend away from the support assembly in many different manners. In accordance with a first embodiment of the present invention, the holding bracket is disconnected from a rearward portion of the support assembly and is thereafter connected to a forward portion of the support assembly in the furtherance of achieving the extended configuration. In accordance with a second embodiment of the present invention, the holding bracket is pivotably connected to the support assembly and is pivoted relative to the support assembly to provide the extended configuration. In accordance with a third embodiment of the present invention, the holding bracket includes a reference hinge plate and a pivoting hinge plate. The reference hinge plate is mounted to the support assembly, and the pivoting hinge plate is pivotally connected to the reference hinge plate. The pivoting hinge plate is pivoted relative to the reference hinge plate to provide the extended configuration.

In accordance with another aspect of the present invention, after the holding bracket is unclamped from the work surface, the holding bracket is manually transitioned from the extended configuration to an unextended configuration, and thereafter the support assembly and the holding bracket are together returned to the enclosed configuration within the housing. In accordance with the first embodiment of the present invention, the holding bracket is disconnected from the forward portion of the support assembly and is thereafter connected to the rearward portion of the support assembly to achieve the unextended configuration. In accordance with the second embodiment of the present invention, the holding bracket is pivoted relative to the support assembly to achieve the unextended configuration. In accordance with the third embodiment of the present invention, the pivoting hinge plate is pivoted relative to the reference hinge plate to provide the unextended configuration.

More specifically, the support assembly includes a support frame connected to and extending rearward from an end cap. The housing defines an internal cavity and an opening thereto. The end cap occludes the opening of the housing during the enclosed configuration, and the end cap is removed from the opening of the housing to provide the unenclosed configuration. The support frame is contained in the cavity during the enclosed configuration, and the support frame is outside of the cavity during the unenclosed configuration. In accordance with the first embodiment of the present invention, the holding bracket is carried by the support frame during the enclosed configuration. More specifically, in accordance with one aspect of the present invention, the holding bracket defines a pair of apertures that receive studs of the support frame to facilitate the connection between the holding bracket and the support frame during the unextended configuration. In accordance with another aspect of the present invention, the holding bracket is held to the support frame by a strap during the unextended configuration. In accordance with another aspect of the present invention, the holding bracket is held to the support frame by a strap during the extended configuration.

In accordance with the first embodiment of the present invention, the holding bracket is connected to both the support frame and the end cap during the extended configuration. More specifically, the holding bracket includes forward and rear connecting mechanisms with the forward connecting mechanism connected to the end cap and the rear connecting mechanism connected to the support frame during the extended configuration. As a result of the separate and distant connecting mechanisms, the holding bracket securely holds the end cap and the support frame.

In accordance with one aspect of the first embodiment of the present invention, the holding bracket can be characterized as including a base portion and several flanges that respectively function as the connecting mechanisms. The base portion has opposite front and rear ends, and the base portion extends in a longitudinal direction between the front and rear ends. The base portion includes right and left edges that extend in the longitudinal direction. The holding bracket also includes a right rear flange, a left rear flange and a front flange, all of which extend upwardly from the base portion. In the extended configuration, the front flange engages the front end of the end cap and is secured to the end cap via a threaded attachment device, or the like. At the same time, the rear flanges engage laterally extending flanges of the support frame to facilitate the connection to the support frame. Whereas the connecting mechanisms of the holding bracket have been described above in terms of specific flanges and functions, the connecting mechanisms are not limited to the flanges or functions described above.

Although not necessary in all embodiments of the present invention, the holding bracket of one advantageous embodiment remains with the closure and is in the unextended configuration while the closure is in the enclosed configuration. Therefore, that bracket is available for use when the closure is placed in the unenclosed configuration, and a holding bracket need not be carried to the closure each time it is serviced. In addition, the holding bracket is constructed so the holding bracket does not interfere with the enclosed configuration when the holding bracket is in the unextended configuration. While the holding bracket is in the extended configuration, a protruding portion of the holding bracket can be clamped in a manner that securely holds the end cap and support frame. Additionally, the holding bracket is shaped so it advantageously does not significantly restrict access to the closure's optical cables, fibers, and splices during the extended configuration.

In accordance with an alternative embodiment of the present invention, the holding bracket is not kept with the closure during the enclosed configuration.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so this disclosure will be thorough and complete, and will fully convey the scope of the invention to those of ordinary skill in the art. Like numbers refer to like elements throughout.

Figure 1:
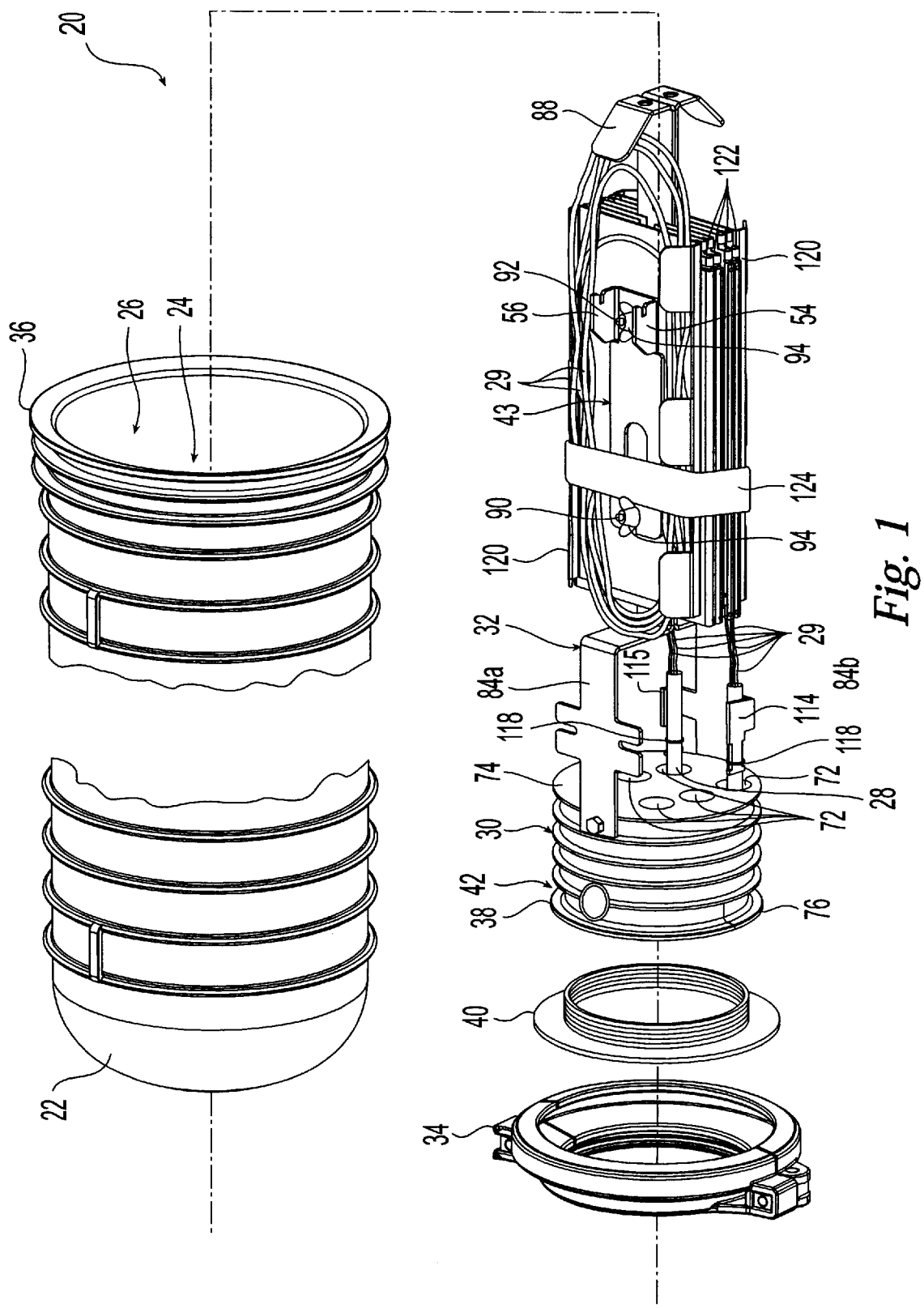
FIG. 1 is a partially exploded, partially schematic, perspective view of a splice closure for containing optical fiber splices, wherein the closure includes a holding bracket that is illustrated in an unextended configuration, in accordance with a first embodiment of the present invention.

Referring now to FIG. 1, an optical fiber interconnection closure that is in the form of a splice closure 20 is illustrated in accordance with a first embodiment of the present invention. Although the closure 20 illustrated in FIG. 1 is a butt-type closure, the closure of the present invention can be an in-line closure or other type of closure without departing from the scope of the present invention.

As illustrated, the closure 20 includes a housing 22 defining an internal cavity 24 and an opening 26 to the cavity. Whereas the housing 22 can have a variety of shapes, the housing of the illustrated embodiment has a generally cylindrical shape that is closed at one end. The cavity 24 receives and the housing 22 carries a support assembly that holds fiber optic cables 28. The support assembly also holds or supports buffer tubes 29 that contain optical fibers (not shown) and extend from end portions of the fiber optic cables 28. The support assembly also supports splices (not shown) that connect the optical fibers.

More specifically, the support assembly includes a support frame 32 connected to and extending rearward from an end cap 30. The support assembly is movable between an enclosed configuration and an unenclosed configuration. In the enclosed configuration, the end cap 30 is positioned in the opening 26 of the housing 22, and the support frame 32, as well as the components carried thereby, are positioned within the cavity 24 of the housing. In contrast, in the unenclosed configuration, which is illustrated in FIG. 1, the end cap 30 is removed from the opening 26 and the support frame 32, as well as the components carried thereby, is removed from the cavity 24.

Although the end cap 30 can be secured to the housing 22 in a variety of different manners that are known to those of ordinary skill in the art, the illustrated closure 20 includes a split annular collar 34 that securely engages a circumferential flange 36 of the housing 22 and a circumferential flange 38 of the end cap 30 to secure the end cap to the housing. The collar 34 and circumferential flanges 36, 38 cooperate with an O-ring 40 that is received in a circumferential channel 42 defined by the end cap 30. As a result, the cavity 24 of the closure 20 is substantially watertight while the closure 20 is in the enclosed configuration.

An advantageous feature of the present invention is a holding bracket 43. The holding bracket 43 is shown in an unextended configuration in FIG. 1. While in the unextended configuration, the holding bracket 43 is connected to a rearward portion of the support frame 32. In contrast to FIG. 1, the holding bracket 43 is shown in an extended configuration in FIGS. 4, 6 and 7, and in the extended configuration the holding bracket is connected to the end cap 30 and a forward portion of the support frame 32, as will be discussed in greater detail below.

Figure 2:
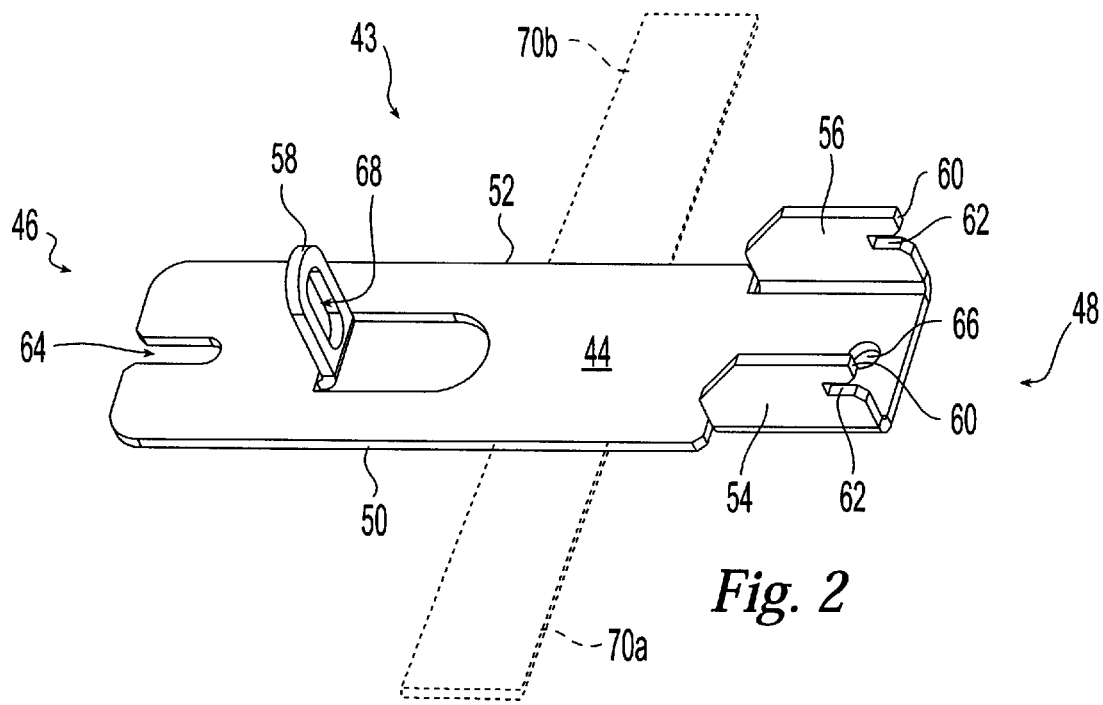
FIG. 2 is an isolated, partially schematic, perspective view of the holding bracket of FIG. 1.

The holding bracket 43 is best seen in FIG. 2. Whereas the holding bracket 43 and other components of the present invention can be placed in many different orientations, the holding bracket and other components of the present invention are at times described herein as being in a particular orientation for purposes of explanation, and not for purposes of limitation. The holding bracket 43 of one advantageous embodiment is constructed of metal and includes a base portion 44 having a front end 46 and a rear end 48, and a right edge 50 and a left edge 52 of the holding bracket extend in a longitudinal direction that is defined between the ends 46, 48. The holding bracket 43 also includes a plurality of flanges for facilitating attachments. In this regard, a right rear flange 54, a left rear flange 56 and a front flange 58 extend upward from the base portion 44. Each of the rear flanges 54, 56 includes an interlocking projection 60 extending above a rear slot 62 that is open toward the rear end 48. A front slot 64 extends through the base portion 44 and is open at the front end 46. A rear hole 66 extends through the base portion 44 between the rear flanges 54, 56. Likewise, a front hole 68 extends through the front flange 58. Each of those slots 62, 64 and holes 66, 68 can be characterized as apertures.

The holding bracket can be constructed to have other arrangements of flanges. In accordance with an alternative embodiment of the present invention, for example, the holding bracket 43 includes a pair of lateral flanges 70a and 70b that are illustrated in broken lines in FIG. 1. One of the lateral flanges 70a extends laterally from the right edge 50 and the opposite lateral flange 70b extends laterally from the left edge 52.

Figure 3:
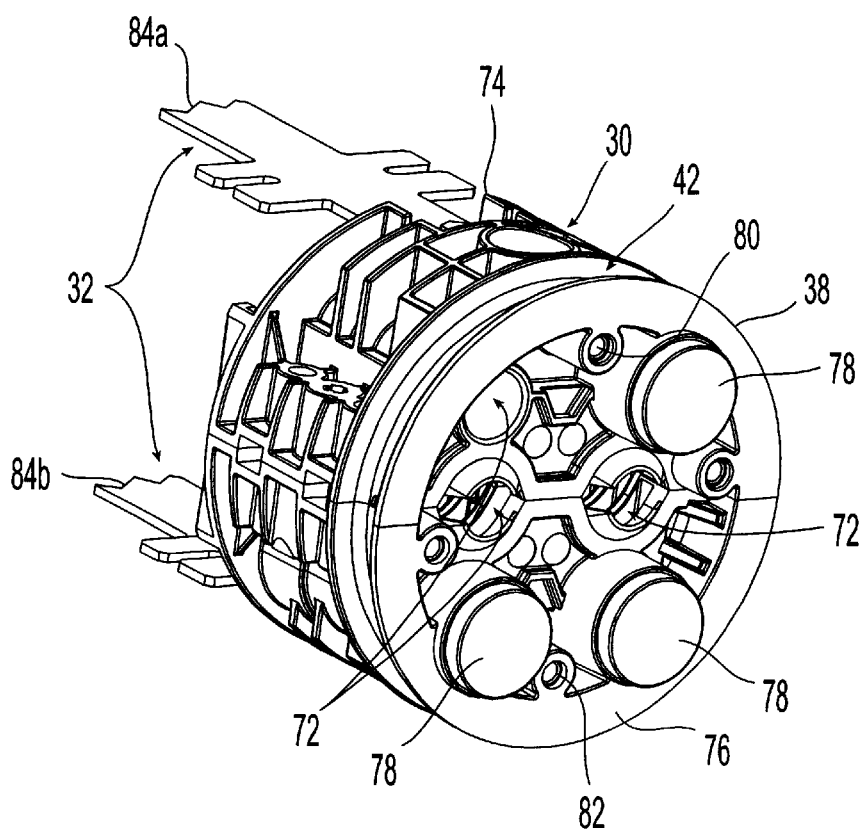
FIG. 3 is a front perspective view of an end cap and a portion of a support frame of the closure of FIG. 1.
Figure 4:
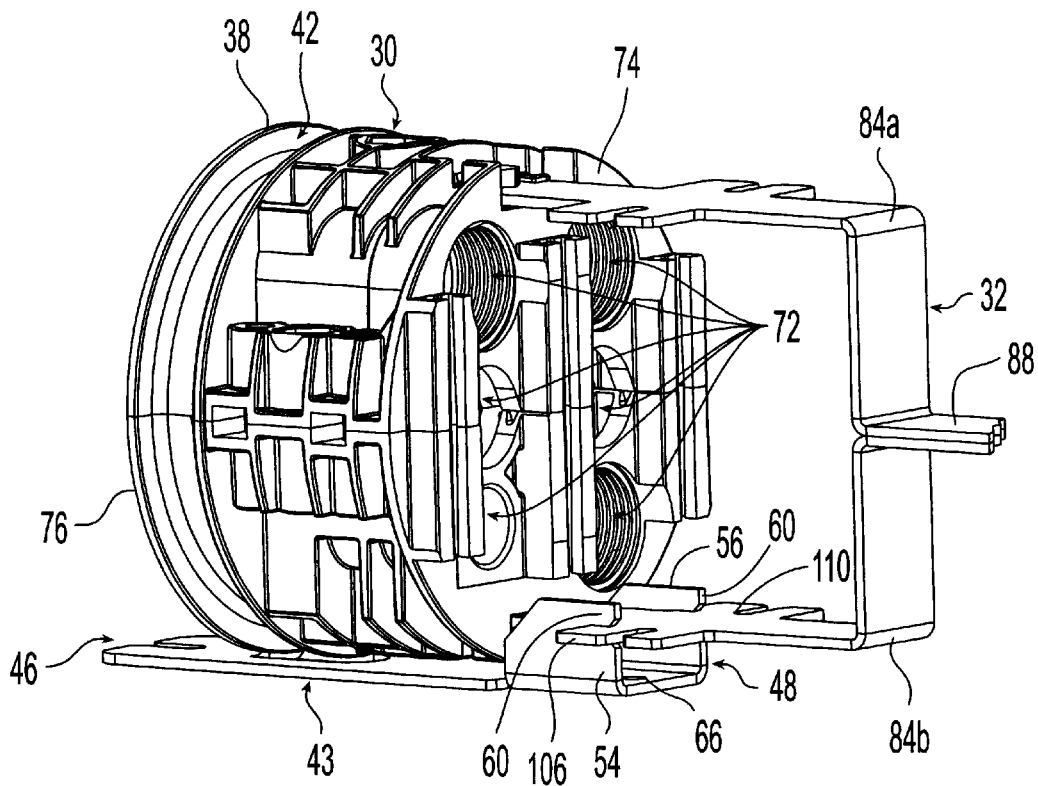
FIG. 4 is a rear perspective view of the end cap, a portion of the support frame, and the holding bracket of FIG. 1, wherein the holding bracket is illustrated in an extended configuration, in accordance with the first embodiment of the present invention.
Figure 6:
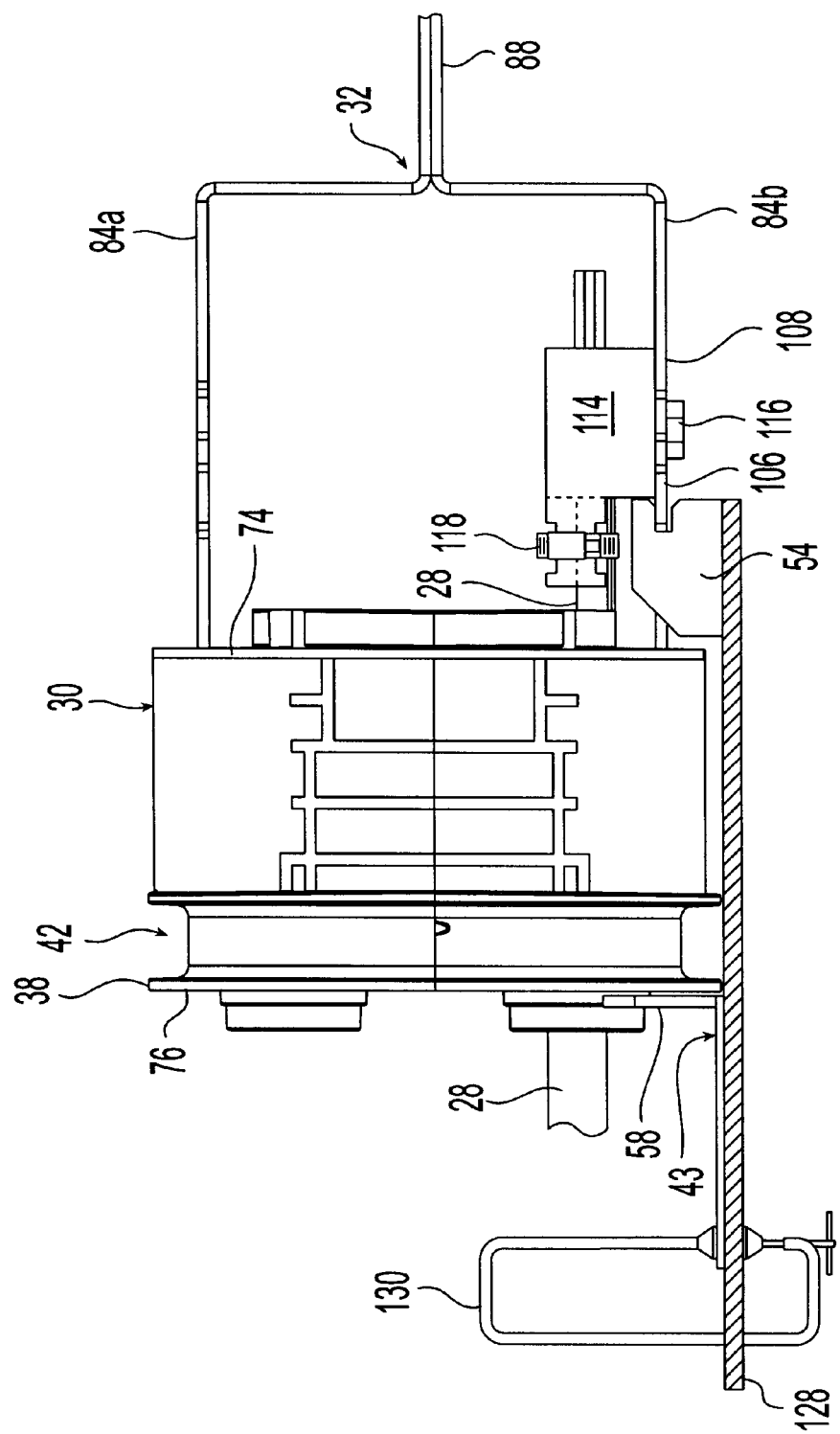
FIG. 6 is a partial, side elevation view of portions of the closure of FIG. 1 in the extended configuration and connected to a work surface by a clamp, in accordance with the first embodiment of the present invention.

As best seen in FIGS. 3 and 4, the end cap 30 defines multiple ports 72 that extend through the end cap for respectively receiving optical cables 28 (FIGS. 1 and 6). As best seen in FIG. 4, all of the ports 72 are open at the rear side 74 of the end cap 30. As best seen in FIG. 3, some of the ports 72 are open at the front side 76 of the end cap 30, but covers 78 removably cover some of the ports at the front side. Whereas the covers 78 are shown occluding the lower ports 72 in FIGS. 3 and 7, in FIGS. 1 and 6, covers do not occlude the lower ports because the optical cables 28 extend through the lower ports.

As best seen in FIG. 3, the front side 76 of the end cap 30 defines an upper receptacle 80 and a lower receptacle 82. Either of the receptacles 80, 82 can be used to at least partially facilitate attachment of the holding bracket 43 (FIGS. 1, 2, 4, 6 and 7) to the end cap and the support frame 32, as will be discussed in greater detail below. The end cap 30 is preferably constructed of a polymeric material, and preferably has an upper half cylinder that is bolted or otherwise secured to a lower half cylinder.

As best seen in FIGS. 1, 3, 4, and 6, the support frame 32 is connected to and extends rearward from the end cap 30. The support frame 32 includes a forward upper frame section 84a that is bolted to an upper portion of the end cap 30, and a forward lower frame section 84b that is bolted to a lower portion of the end cap. A rear frame section 88 (FIGS. 1, 4, and 6) is connected to and extends rearward from the rear of the forward frame sections 84a, 84b.

Referring to FIG. 1, a front stud 90 and a rear stud 92 are connected to and extend upward from the upper surface of rear frame section 88. The studs 90, 92 are preferably threaded and each has a wing nut 94, or a quick connecting and disconnecting item, or the like, removably fastened thereto. A similar pair of studs 91, 93 (FIG. 11) extend downward from the bottom surface of the rear frame section 88 and receive similar wing nuts (not shown), quick connecting and disconnecting items, or the like. The support frame 32 is preferably constructed of metal.

Figure 5:
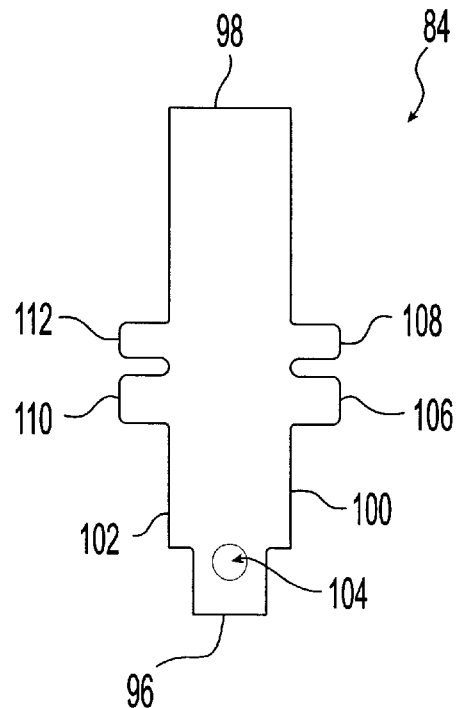
FIG. 5 is an isolated plan view of one of the forward portions of the support frame of FIG. 1.

As best seen in FIG. 5, which illustrates a representative one of the forward frame sections 84a, 84b (FIGS. 1, 3, 4, and 6), the frame section includes a front end 96 and a rear end 98. Each forward frame section 84 also has a right side 100 and a left side 102 that extend in a longitudinal direction between the ends 96, 98. An attachment hole 104 is defined through the frame section 84 proximate to the front end 96, and a bolt passes through the attachment hole to attach the frame section to the end cap 30 (FIGS. 1, 3, 4, 6, and 7). The forward frame section 84 further includes a right front flange 106, right rear flange 108, left front flange 110 and a left rear flange 112 that respectively extend laterally from the right side 100 and the left side 102.

As best seen in FIG. 1, a right strain-relief bracket 114 is connected to the right flanges 102, 104 (FIG. 5) of the forward lower frame section 84b, and a left strain-relief bracket 115 is connected to the left flanges 106, 108 of the forward lower frame section. As best seen in FIG. 6, the representative strain-relief bracket 114 is positioned upon the inward-oriented surfaces of the right front flange 106 and the right rear flange 108. A screw 116, or the like, extends through the gap defined between the right front flange 106 and the right rear flange 108 and into an aperture (not shown) defined in the strain-relief bracket 114 to secure the strain-relief bracket to the lower frame section 84b.

As best understood with reference to FIG. 1, optical cables 28 extend through respective ports 72 of the end cap 30. For each optical cable 28, a respective hose clamp 118, or the like, extends therearound and attaches the optical cable to the respective strain-relief bracket 114 or 115. Buffer tubes 29 extend from the optical cables 28 and excess portions of the buffer tubes are stored in slack baskets 120 that are adjacent to the splice trays 122. Within each splice tray 122, ends of the optical fibers (not shown) extending from the buffer tubes 29 are spliced together (not shown). An upper group of the splice trays 122 and an upper one of the baskets 120 are connected to the upper side of the rear frame section 88 by way of the front stud 90, rear stud 92, and wing nuts 94, or the like. A lower group of the splice trays 122 and a lower one of the baskets 120 are similarly attached to the lower side of the rear frame section 88 by the studs 91, 93 (FIG. 11) and wing nuts, or the like.

Each of the splice trays 122 and the baskets 120 defines a pair of apertures that receive the respective studs 90, 92 or 91, 93 (FIG. 11) that extend from the opposite sides of the rear frame section 88, and those respective studs receive wing nuts (such as the wing nuts 94), or the like, to secure the spice trays and baskets to the rear frame section. In addition, an elongate fastener, which is preferably a strap 124, is wrapped around the baskets 120 and the splice trays 122 in a manner that assists in the securing of the baskets and the splice trays to the rear frame section 88. The ends of the strap 124 preferably include pieces of attachment material, such as that sold under the trademark VELCRO, clasps, or other connecting mechanisms that allow the strap 124 to securely hold the baskets 120, splice trays 122 and excess portions of buffer tubes 29 to the rear frame section 88. In addition, the strap 124 functions to hold the holding bracket 43 to the rear frame section 88 while the holding bracket is in the unextended configuration.

As mentioned previously, the holding bracket 43 is advantageously utilized when the closure 20 is being serviced in the unenclosed configuration. More specifically, the holding bracket 43 can be advantageously utilized when the closure 20 has been reconfigured from the enclosed configuration to the unenclosed configuration. As mentioned above with reference to FIG. 1, in the enclosed configuration the support frame 32 is in the cavity 24 and the end cap 30 is in the opening 26. In contrast, in the unenclosed configuration, the support frame is removed from the cavity and the end cap is likewise removed from the opening.

Figure 11:
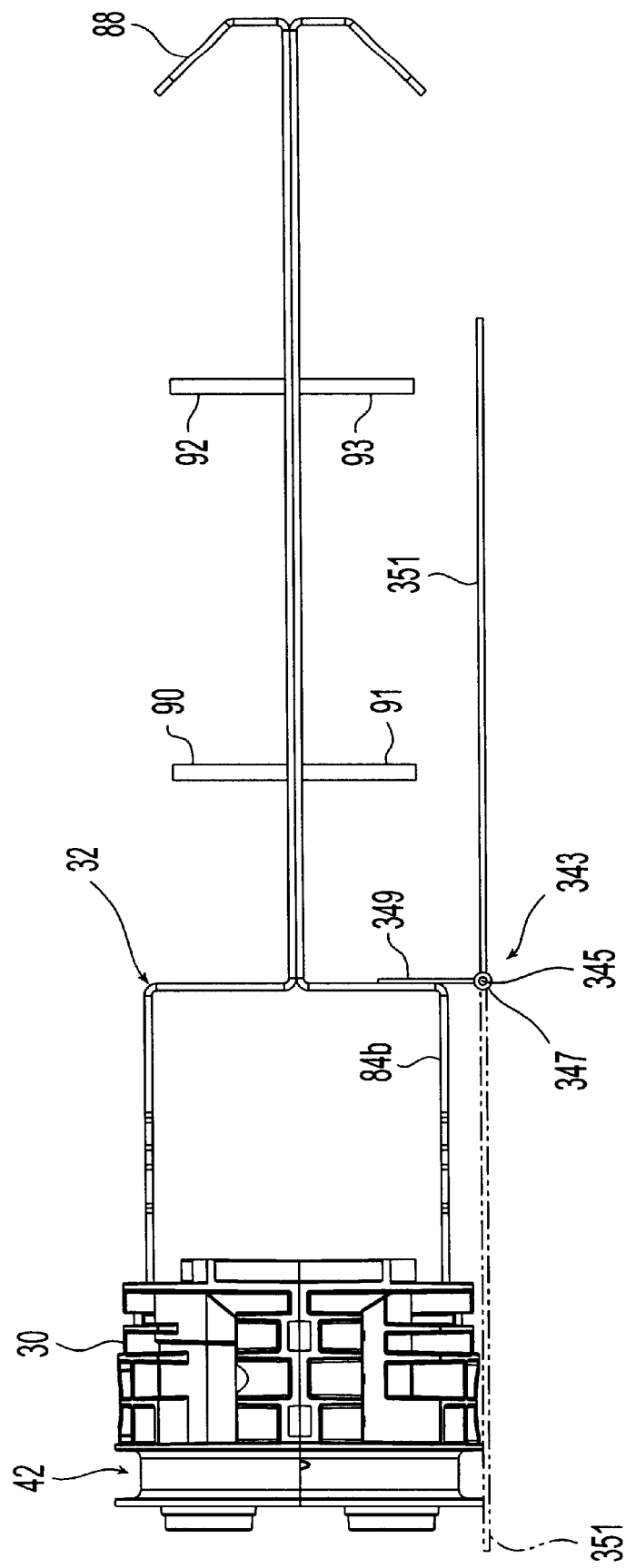
FIG. 11 is a partially schematic, side elevation view of an end cap, support frame, and holding bracket assembly, wherein a pivoting hinge plate of the holding bracket assembly is illustrated in an unextended configuration by solid lines, and the pivoting hinge plate is illustrated in an extended configuration by broken lines, in accordance with a third embodiment of the present invention.

In accordance with the first embodiment of the present invention, the holding bracket 43 is preferably in the unextended configuration while the closure 20 is in the enclosed configuration. In the unextended configuration, which is illustrated in FIG. 1, the front stud 90 extends through the front slot 64 (FIG. 2) of the holding bracket 43 and the rear stud 92 extends through the rear hole 66 (FIG. 2) of the holding bracket, and the wing nuts 24, or the like, are secured to the studs 90, 92 to secure the holding bracket to the studs 90, 92. Alternatively, the front slot 64 of the holding bracket 43 can receive the rear stud 92 and the rear hole 66 of the holding bracket can receive the front stud 90. In similar manners, the holding bracket 43 can be connected to the studs 91, 93 (FIG. 11). In addition, the strap 124 can extend around the holding bracket 43, splice trays 122, baskets 120 and the rear frame section 88 to secure the holding bracket to the rear frame section.

Because the holding bracket 43 is secured to the rear frame section 88 while the closure 20 is in the enclosed configuration, after the closure 20 is transitioned from the enclosed configuration to the unenclosed configuration, the holding bracket 43 is advantageously readily available for movement from the unextended configuration to the extended configuration. More specifically, while the closure 20 is in the unenclosed configuration, the holding bracket 43 is prepared for movement away from the unextended configuration by removing the wing nuts 94, or the like, from the studs 90, 92 and removing the strap 124 from the rear frame section 88. Thereafter, the holding bracket 43 is removed from the studs 90, 92 and the rear frame section 88 so the holding bracket can be positioned in the extended configuration, which is illustrated in FIGS. 4, 6, and 7.

As best seen in FIG. 4, in order to place The holding bracket 43 in the extended configuration, the holding bracket is moved relative to the forward lower frame section 84b so the forward edge of the right front flange 106 of the forward lower frame section is received in the rear slot 62 (FIG. 2) of the right rear flange 54 of the holding bracket, and the front edge of the left front flange 110 of the forward lower frame section is received in the rear slot 62 of the left rear flange 56 of the holding bracket. As best seen in FIG. 7, the front hole 68 of the holding bracket 43 is thereafter aligned with the lower receptacle 82 (FIG. 3) that is defined by the front side 76 of the end cap 30 and a threaded fastener, such as a screw 126, or the like, is inserted through the front hole and threaded into the lower receptacle to secure the holding bracket to the end cap and the support frame 32. As an alternative to using the screw 126, a non-threaded fastener, such as a plug or a peg, or the like, is inserted through the front hole 68 and extends through the front hole and into the lower receptacle 82 to secure the holding bracket to the end cap 30 and the support frame 32.

Figure 7:
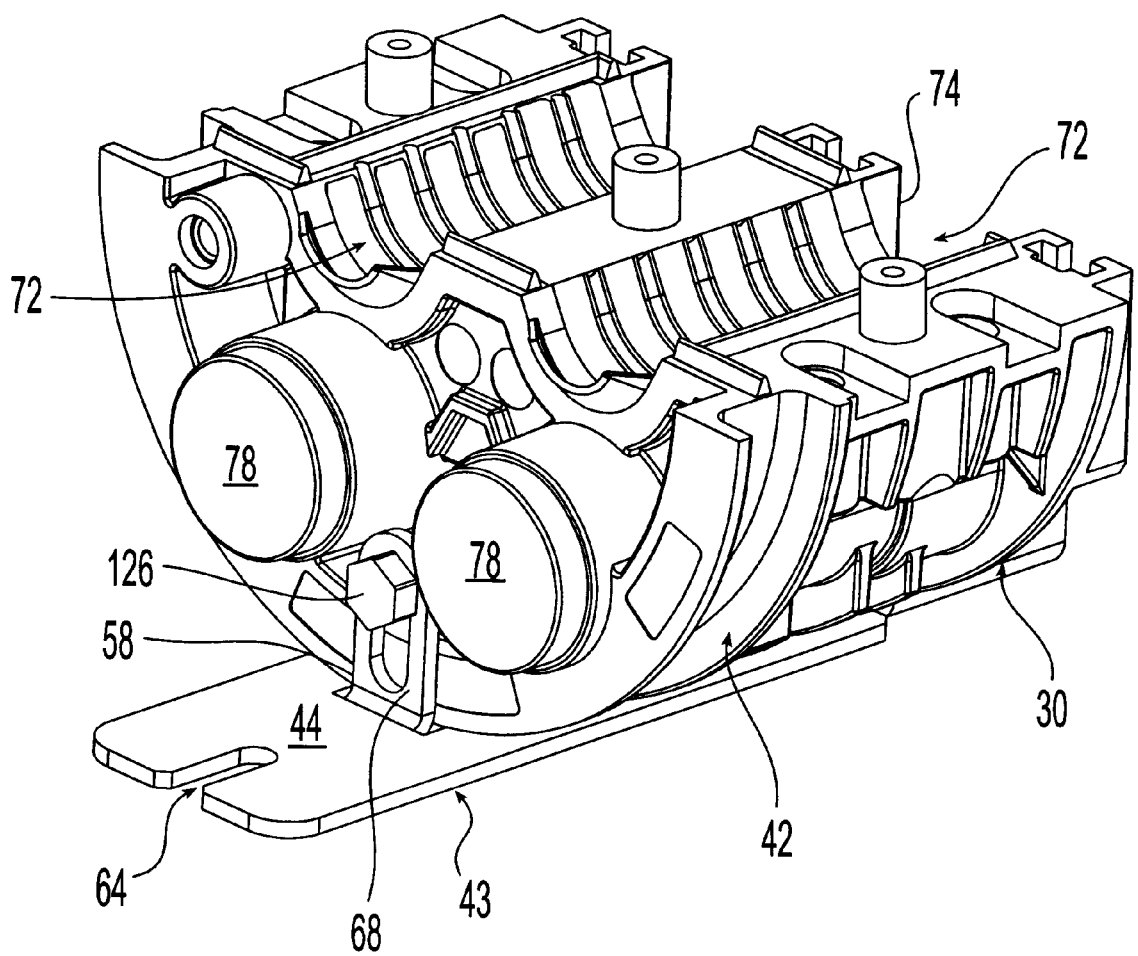
FIG. 7 is a front perspective view of a lower half of the end cap and the holding bracket of FIG. 1, wherein the holding bracket is in the extended configuration, in accordance with the first embodiment of the present invention.

In accordance with the first embodiment of the present invention, the end cap 30 includes an upper half that is bolted to a lower half, and only the lower half of the end cap is shown in FIG. 7. During the process of placing fiber optic cables 28 (FIGS. 1 and 6) through the ports 72 that are shown in FIG. 7, the support frame 32 (FIGS. 1, 3, 4, and 6) is separated from the end cap 30 and the upper half of the end cap is removed from the lower half of the end cap. The holding bracket 43 is advantageously operative to securely hold the lower half of the end cap 30 when the lower half of the end cap is separated from the support frame 32 and the upper half of the end cap. While the holding bracket 43 is mounted to the lower half of the end cap 30 as illustrated in FIG. 7, the forward vertical surfaces of the rear flanges 54, 56 (FIGS. 1, 2, 4, and 6) abut a lower portion of the rear side 74 of the lower half of the end cap 30. As a result of the front flange 58 and the rear flanges 54, 56, solely the lower half of the end cap 30 can be securely held by the holding bracket 43.

In accordance with an alternative embodiment of the present invention, the holding bracket 43 does not include the front flange 58. In accordance with this alternative embodiment, the screw 126, or the like, is inserted through a hole (not shown) in the base portion 44 (FIG. 2) of the holding bracket 43 and is threaded into a hole (not shown) that is open at the lower circumferential outer surface of the end cap 30. In accordance with another alternative embodiment of the present invention, the strap 124 (FIG. 1) is used to connect the holding bracket 43 to the end cap 30. While the holding bracket 43 is in the extended configuration, the strap 124 is circumferentially wrapped around the end cap 30 and the holding bracket, and the connecting mechanisms connected to the opposite ends of the strap are secured to one another so the strap securely holds the holding bracket to the end cap. When the strap 124 is wrapped around the end cap and the holding bracket 43 as described above, it is preferred for the strap to the taut and for portions of the strap that are distant from the holding bracket 43 to be positioned in the circumferential channel 42 of the end cap 30 so the strap is prevented from sliding off the end cap.

As best seen in FIG. 4, when the forward edges of the front flanges 110, 112 of the forward lower frame section 84*b* are received by the respective rear slots 62 (FIG. 2) of the holding bracket 43, the interlocking projection 60 of the left rear flange 56 overlaps the left front flange 110 and the interlocking projection 60 of the right rear flange 54 overlaps the right front flange 112. Thereafter, when the front flange 58 is secured to the front side 76 of the end cap 30 as illustrated in FIG. 7 and discussed above, the interlocking projections 60 become interlocked to their respective front flanges 106, 110. Additionally, the right rear flange 54 of the holding bracket 43 is to the right of and proximate to the right side 100 (FIG. 5) of the forward lower frame section 84*b*, and the left rear flange 56 of the holding bracket is to the left of and proximate to the left side 102 (FIG. 5) of the forward lower frame section to restrict lateral movement of the holding bracket relative to the lower frame section.

As best understood with reference to FIGS. 6 and 7, the front flange 58 of the holding bracket 43 can be characterized as a forward connecting mechanism that connects to the end cap 30, and the rear flanges 54, 56 of the holding bracket can be characterized as a rear connecting mechanism that connects to the forward lower frame section 84*b* while the holding bracket is in the extended configuration. The above-discussed components that can be used as an alternative to the front flange 58 to facilitate connection between the holding bracket 43 and the end cap 30 can also be characterized as forward connecting mechanisms, and the several different forward connecting mechanisms can be used in various combinations. The forward and rear connecting mechanisms are advantageously distant from one another so the internal components of the closure 20 (FIG. 1) are securely held by the holding bracket 43 while the holding bracket is in the extended configuration.

As best seen in FIG. 6, after the holding bracket 43 has been placed in the extended configuration, which is also illustrated in FIGS. 4 and 7, the portion of the holding bracket 43 that is forward of the front flange 58 extends forward from the front side 76 of the end cap 30, and that forward portion of the holding bracket can be characterized as a protruding portion. That protruding portion of the holding bracket 43 can be readily secured to a work surface 128, which can be the surface of a table, or any other frame of reference or the like, through the use of a clamp 130. The holding bracket 43, clamp 130 and work surface 128 cooperate to securely hold the internal components of the closure 20 (FIG. 1) so those internal components can be optimally serviced. Advantageously, while the clamp 130 is holding the protruding portion of the holding bracket 43 to the work surface 128, neither the clamp 130 nor the holding bracket substantially restricts access to portions of the optic cables 28, buffer tubes 29, splices and associated components that are being supported by the support frame 32. In particular, as shown in FIG. 6, the holding bracket 43 is advantageously constructed and arranged so it in no way interferes with the strain-relief brackets 114 and 115 (FIG. 1) while in the extended configuration. In accordance with the alternative embodiment of the present invention in which the holding bracket 43 includes the lateral flanges 70, 70*b* (FIG. 2), either of the lateral flanges may be clamped to the work surface 128 rather than, or in addition to, clamping the protruding portion of the holding bracket to the work surface.

Subsequent to servicing the closure 20 (FIG. 1), the holding bracket 43 is moved from the extended configuration to the unextended configuration, and the closure is placed in the enclosed configuration. In the furtherance of moving the holding bracket 43 from the extended configuration to the unextended configuration, the holding bracket is removed from the end cap 30 by detaching the screw 126 (FIG. 7) from the end cap and pivoting the front end 46 of the holding bracket away from the end cap, and thereafter moving the holding bracket forward relative to the end cap so the rear end 48 of the holding bracket is disengaged from the support frame 32. As best seen in FIGS. 4 and 6, upper forward edges of the rear flanges 54, 56 of the holding bracket are angled so they will clear the rear side 74 of the end cap 30 when the holding bracket 43 is removed therefrom.

Thereafter, the holding bracket 43 is returned to the unextended configuration, which is illustrated in FIG. 1, such as by moving the holding bracket toward the rear frame section 88 so the front stud 90 passes through the front slot 64 (FIG. 2) in the holding bracket and the rear stud 92 passes through the rear hole 66 (FIG. 2) in the holding bracket. Thereafter, the wing nuts 94, or the like, are secured to the studs 90, 92 and the strap 124 is secured around the holding bracket 43, rear frame section 88, baskets 120 and splice trays 122 so the holding bracket is held in the unextended configuration. While the holding bracket 43 is in the unextended configuration, the screw 126 (FIG. 7) is preferably stored by threading it into either one of the receptacles 80, 82 (FIG. 3) of the end cap 30, where the screw 126 can remain without interfering with the leak-tightness of the closure 20 or the transitioning between the enclosed and unenclosed configurations.

While the holding bracket 43 is in the unextended configuration illustrated in FIG. 1, the end cap 30 and the support frame 32 are secured to the housing 22 as described above so the closure 20 is in the enclosed configuration. That is, in accordance with the first embodiment of the present invention, the holding bracket 43 is connected to the support frame 32 and within the housing 22 while the closure 20 is in the enclosed configuration, so the holding bracket will be readily available for being placed in the extended configuration the next time the closure 20 is in the unenclosed configuration.

In accordance with an alternative embodiment of the present invention, the holding bracket 43 is not placed in the unextended configuration and stored within the housing 22. Rather, the holding bracket 43 is carried from one closure 20 to another so one holding bracket is sequentially used in the servicing of multiple closures.

Whereas the holding bracket 43 has been described with respect to attachment to the forward lower frame section 84*b* (FIGS. 1, 3, 4, and 6) and the lower receptacle 82 (FIG. 3), those of ordinary skill in the art will appreciate that the holding bracket can be similarly attached to the forward upper frame section 84*a* (FIGS. 1, 3, 4, and 6) and the upper receptacle 80 (FIG. 3).

A closure of a second embodiment of the present invention is identical to the closure 20 (FIG. 1) of the first embodiment of the present invention, except for variations noted herein and variations that will be apparent to those of ordinary skill in the art. That is, the closure of the second embodiment is operative for containing optical fiber splices (not shown) and includes a support assembly and a housing (not shown, but see housing 22 of FIG. 1, for example) for substantially containing the support assembly. The support assembly supports the splices. More specifically, and with reference to FIGS. 8 and 10, in accordance with the second embodiment of the present invention, the support assembly includes a support frame 232 that is connected to and extends rearward from an end cap 230. The support frame 232 carries splice trays and at least one basket (not shown, but see the splice trays 122 and baskets 120 illustrated in FIG. 1, for example). An elongate holding bracket 243, which is best seen in FIG. 9, is pivotally connected to the support frame 232 by a rivet 233 (FIG. 10), or the like.

Figure 8:
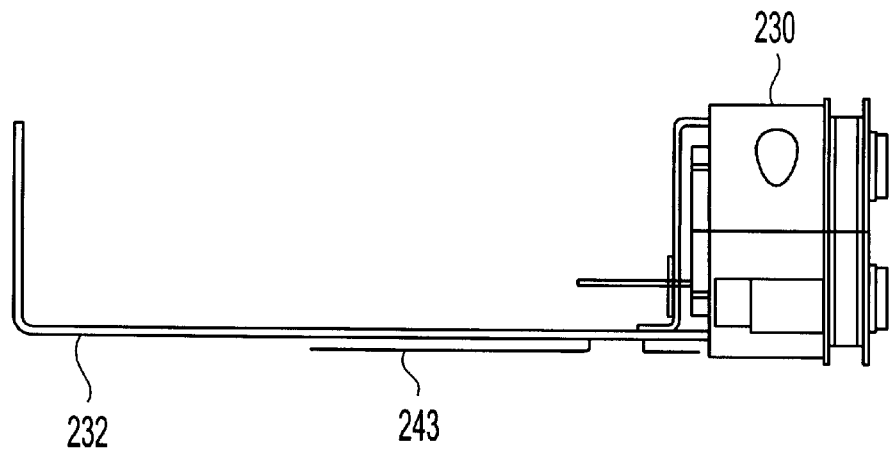
FIG. 8 is a side elevation view of an end cap, support frame, and holding bracket in an unextended configuration, in accordance with a second embodiment of the present invention.
Figure 9:
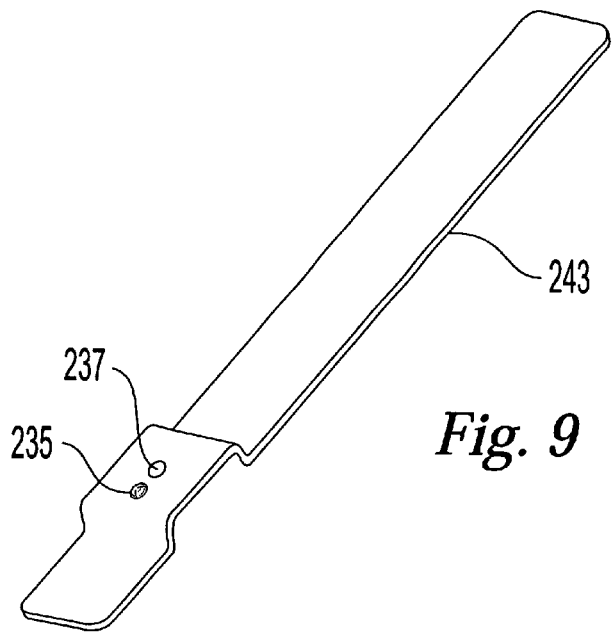
FIG. 9 is an isolated perspective view of the holding bracket of FIG. 8.
Figure 10:
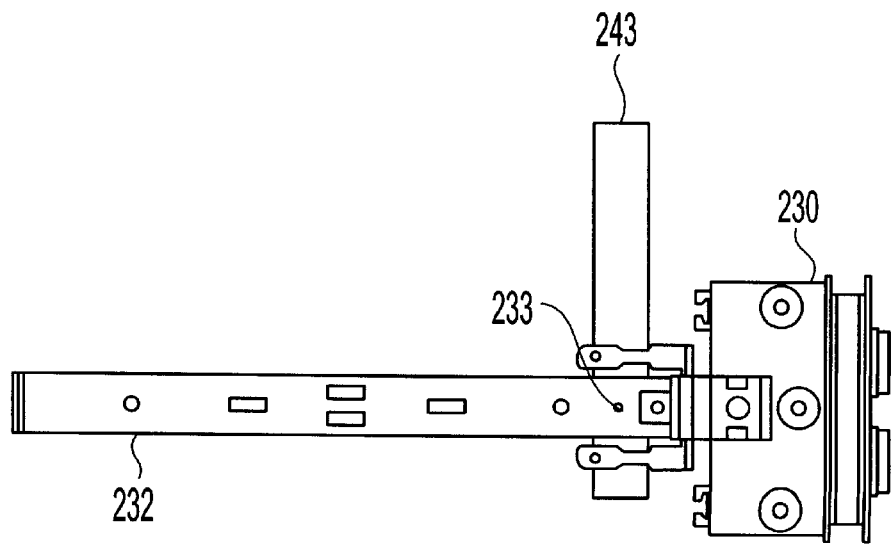
FIG. 10 is a top plan view of the assembly illustrated in FIG. 8, with the holding bracket in an extended configuration, in accordance with the second embodiment of the present invention.

The holding bracket 243 is capable of being manually pivoted approximately 90 degrees between an unextended configuration, which is illustrated in FIG. 8, and an extended configuration, which is illustrated in FIG. 10. While the holding bracket 243 is in the unextended configuration, the holding bracket is substantially aligned with the support frame 232 so the end cap 230 and the support frame, with the holding bracket connected thereto, can be placed in an enclosed configuration, which is like the enclosed configuration discussed above with reference to the first embodiment of the present invention.

While the holding bracket 243 is in the extended configuration illustrated in FIG. 10, the portion of the holding bracket that protrudes furthest from the support frame 232 can be clamped to a work surface through the use of a clamp (such as the C-clamp 130 illustrated in FIG. 6), or the like. The portion of the holding bracket 243 that protrudes furthest from the support frame 232 can be characterized as a protruding portion. While in the extended configuration, neither the clamp nor the holding bracket 243 substantially interferes with or blocks access to the optic cables, optical fibers, or optical fiber splices carried by the support frame 232.

The holding bracket 243 is preferably equipped with a locking mechanism that is operative to releasably hold the holding bracket in the extended and unextended configurations. As seen in FIG. 9, the locking mechanism includes a small locking protrusion 235 that extends upward from the upper surface of the holding bracket 243. The locking protrusion 235 is proximate to a hole 237 that is defined through the holding bracket 243 and receives the rivet 233 (FIG. 10). A pair of spaced apart recesses (not shown) are defined in the bottom surface of the support frame 232 for removably receiving the locking protrusion 235 while the holding bracket 243 is in the extended and unextended configurations, respectively. The locking protrusion 235 cooperates with the recesses to releasably hold the holding bracket in the extended and unextended configurations, respectively. Additional recesses (not shown) can be defined in the bottom surface of the support frame 232 for removably receiving the locking protrusion 235 while the holding bracket 243 is arranged in configurations other than the illustrated extended and unextended configurations.

While the holding bracket 243 is in the unextended configuration illustrated in FIG. 8, the end cap 230 and the support frame 232 are secured to their housing (not shown, but see housing 22 of FIG. 1, for example) to provide the enclosed configuration. That is, in accordance with the second embodiment of the present invention, the holding bracket 243 is connected to the support frame 232 and within the housing while the enclosure of the second embodiment of the present invention is in the enclosed configuration, so the holding bracket will be readily available for being placed in the extended configuration the next time the closure is in the unenclosed configuration.

In accordance with a variation of the second embodiment of the present invention, the support frame 232 includes right and left stop brackets, such as L-shaped brackets, or the like. The stop brackets are operative to restrict the pivoting of the holding bracket 243 so the holding bracket can only be pivoted ninety degrees between the extended and unextended configurations. At least a portion of the right stop bracket extends downward form the right side of the support frame 232 and is engaged by the holding bracket 243 when the holding bracket is in the extended configuration. At least a portion of the left stop bracket extends downward from the left side of the support frame 232 and is engaged by the holding bracket 243 when the holding bracket is in the unextended configuration.

A closure of a third embodiment of the present invention is identical to the closure 20 (FIG. 1) of the first embodiment of the present invention, except that a holding bracket assembly 343 of the third embodiment of the present invention is different from the holding bracket 43 (FIGS. 1, 2, 4, 6, and 7) of the first embodiment of the present invention. That is, the closure of the third embodiment of the present invention is operative for containing optical fiber splices (not shown) and includes a support assembly (that is, a support frame 32 connected to and extending rearward from an end cap 30) and a housing (see housing 22 of FIG. 1) for substantially containing the support assembly.

In accordance with the third embodiment of the present invention, the holding bracket assembly 343 includes a pivot pin 345 that is coaxial with and extends through a pivoting cylinder 347 and a reference cylinder. The reference cylinder is hidden from view behind the pivoting cylinder 347 in FIG. 11. The bracket assembly 343 further includes a reference hinge plate 349 that is connected to and extends from the reference cylinder, and an elongate pivoting hinge plate 351 that is connected to and extends from the pivoting cylinder 347. The reference hinge plate 349 is permanently mounted to the rear surface of the upright portion of the forward lower frame section 84b by fasteners, such as threaded nuts and bolts, or by welding, or the like. The pivoting cylinder 347 and the pivoting hinge plate 351 are together capable of being pivoted approximately 180 degrees between an unextended configuration and an extended configuration. In FIG. 11, solid lines illustrate the pivoting hinge plate 351 in the unextended configuration, and broken lines illustrate the pivoting hinge plate in the extended configuration. The pivoting hinge plate 351 can be generally characterized as a holding bracket that is pivotally connected to the support frame 32.

In accordance with the third embodiment of the present invention, the strap 124 (FIG. 1) is used to respectively hold the pivoting hinge plate 351 in the unextended and extended configurations. While the pivoting hinge plate 351 is in the unextended configuration, the strap 124 is wrapped around the pivoting hinge plate, baskets 120 (FIG. 1), splice trays 122 (FIG. 1), and excess portions of buffer tubes 29 (FIG. 1). Thereafter, the above-discussed connecting mechanisms connected to the opposite ends of the strap 124 are secured to one another so the strap securely holds the pivoting hinge plate 351, baskets 120, splice trays 122, and excess portions of buffer tubes 29 to the rear frame section 88.

While the pivoting hinge plate 351 is in the extended configuration, the strap 124 (FIG. 1) is circumferentially wrapped around the end cap 30 and the pivoting hinge plate, and the connecting mechanisms connected to the opposite ends of the strap are secured to one another so the strap securely holds the pivoting hinge plate to the end cap. When the strap 124 is wrapped around the end cap 30 and the pivoting hinge plate 351, it is preferred for the strap to be taut and for portions of the strap that are distant from the pivoting hinge plate to be positioned in the circumferential channel 42 of the end cap 30, so the strap is prevented from sliding off the end cap. In that configuration, the strap 124 can be characterized as a forward connecting mechanism that connects the pivoting hinge plate 351 to the end cap 30, and the reference hinge plate 349 can be characterized as a rear connecting mechanism that connects the pivoting hinge plate to the forward lower frame section 84b. In accordance with an alternative embodiment of the present invention, rather than, or in addition to using the strap 124 as the forward connecting mechanism, a screw, or the like, is inserted through a hole (not shown) in the pivoting hinge plate 351 and is threaded into a hole (not shown) that is open at the lower circumferential outer surface of the end cap 30. As mentioned above, the pivoting hinge plate 351 can be referred to as a holding bracket.

While the pivoting hinge plate 351 of the holding bracket assembly 343 is in the extended configuration illustrated by broken lines in FIG. 11, the portion of the pivoting hinge plate that protrudes furthest from the support frame 32 can be clamped to a work surface through the use of a clamp (such as the C-clamp 130 illustrated in FIG. 6), or the like. The portion of the pivoting hinge plate 351 that protrudes furthest from the support frame 32 can be characterized as a protruding portion. While in the extended configuration, neither the clamp nor any portion of the holding bracket assembly 343 substantially interferes with or blocks access to the optic cables, optical fibers, or optical fiber splices carried by the support frame 32.

While the holding bracket assembly 343 is in the unextended configuration illustrated by solid lines in FIG. 11, the end cap 30 and the support frame 32 are secured to their housing 22 (FIG. 1) to provide the enclosed configuration. That is, in accordance with the third embodiment of the present invention, the holding bracket assembly 343 is connected to the support frame 32 and within the housing 22 while the enclosure is in the enclosed configuration, so the holding bracket assembly will be readily available for being placed in the extended configuration the next time the closure is in the unenclosed configuration.

Advantageously, in accordance with the preferred embodiments of the present invention, each of the holding brackets is manually movable between the unextended configuration and the extended configuration. For each closure, while the holding bracket thereof is in the unextended configuration, the holding bracket does not interfere with the placing of the closure in the enclosed configuration or the unenclosed configuration. The holding bracket preferably remains with and is attached to a portion of the closure while the closure is in the enclosed configuration, so the holding bracket is readily available to be configured in the extended configuration when the closure is placed in the unenclosed configuration for servicing. Further, while the closure is in the unenclosed configuration and the holding bracket is in the extended configuration, the holding bracket is arranged so it does not inhibit access to the optical cables, fibers and splices that are carried by the closure.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A closure for containing optical fiber splices and that can be efficiently serviced through the use of a clamping device, the closure comprising:

a housing defining an internal cavity;

a support assembly operative for supporting the optical fiber splices, wherein a substantial portion of the support assembly is capable of being contained in the cavity to provide an enclosed configuration, and the support assembly is further capable of being removed from the cavity to provide an unenclosed configuration, the support assembly comprising an end cap and a support frame that is connected to and extends rearward from the end cap; and a holding bracket connected to the support assembly and movable between an extended configuration and an unextended configuration, wherein the holding bracket is arranged so as not to interfere with movement of the support assembly from the unenclosed configuration to the enclosed configuration while the holding bracket is in the unextended configuration, the holding bracket comprising a rear portion that is in an overlapping configuration with a portion of the support frame, a forward portion connected to the end cap in a manner that causes the rear portion of the holding bracket to be interlocked to the support frame, and a protruding portion that extends outwardly from the support assembly while the holding bracket is in the extended configuration so the protruding portion is available to be clamped by the clamping device, whereby the clamping device does not substantially interfere with the servicing of the optical fiber splices.

2. A closure for containing optical fiber splices and that can be efficiently serviced through the use of a clamping device, the closure comprising:

a housing defining an internal cavity and an opening to the internal cavity;

a support assembly operative for supporting the optical fiber splices, wherein a substantial portion of the support assembly is capable of being contained in the cavity to provide an enclosed configuration, and the support assembly is further capable of being removed from the cavity to provide an unenclosed configuration, the support assembly comprising an end cap and a support frame that is connected to and extends from the end cap, wherein the end cap occludes the opening of the housing and the support frame is positioned in the internal cavity while the closure is in the enclosed configuration; and a holding bracket comprising an elongate member that is pivotally connected to the support assembly and operative for pivoting between an extended configuration and an unextended configuration, wherein the holding bracket is substantially aligned with the support frame in the unextended configuration and is arranged so as not to interfere with the movement of the support assembly from the unenclosed configuration to the enclosed configuration while the holding bracket is in the unextended configuration, and wherein the holding bracket is substantially perpendicular to the support frame while in the extended configuration, the holding bracket further comprising a protruding portion that extends outwardly from the support assembly while the holding bracket is in the extended configuration so the protruding portion is available to be clamped by the clamping device, whereby the clamping device does not substantially interfere with the servicing of the optical fiber splices.

3. A closure for containing optical fibers comprising:

a housing defining an internal cavity;

a support assembly operative for supporting the optical fibers, the support assembly contained in the cavity to provide an enclosed configuration and removed from the cavity to provide an unenclosed configuration, the support assembly comprising an end cap and a support frame that is connected to and extends from the end cap; and a holding bracket that is pivotally connected to the support frame of the support assembly and operative for pivoting between an extended configuration and an unextended configuration, wherein the holding bracket is substantially aligned with the support frame and arranged so as not to interfere with movement of the support assembly from the unenclosed configuration to the enclosed configuration when in the unextended configuration, the holding bracket comprising a protruding portion that extends outwardly from the support assembly when the holding bracket is in the extended configuration so the protruding portion is available to be clamped by a clamping device that does not substantially interfere with servicing the optical fibers.

4. A closure for containing optical fibers comprising:

a housing defining an internal cavity, a support assembly operative for supporting the optical fibers, the support assembly contained in the cavity to provide an enclosed configuration and removed from the cavity to provide an unenclosed configuration, the support assembly comprising an end cap and a support frame that is connected to and extends from the end cap; and a holding bracket that is pivotally connected to the support frame of the support assembly and operative for pivoting between an extended configuration and an unextended configuration, wherein the holding bracket is substantially aligned with the support frame and arranged so as not to interfere with movement of the support assembly from the unenclosed configuration to the enclosed configuration when in the unextended configuration and is substantially perpendicular to the support frame when in the extended configuration, the holding bracket comprising a protruding portion that extends outwardly from the support assembly when the holding bracket is in the extended configuration so the protruding portion is available to be clamped by a clamping device that does not substantially interfere with servicing the optical fibers.

5. A closure for containing optical fibers comprising:

a housing defining an internal cavity;

a support assembly operative for supporting the optical fibers, the support assembly contained in the cavity to provide an enclosed configuration and removed from the cavity to provide an unenclosed configuration, the support assembly comprising an end cap and a support frame that is connected to and extends rearward from the end cap; and a holding bracket connected to the support assembly and movable between an extended configuration and an unextended configuration, wherein the holding bracket is arranged so as not to interfere with movement of the support assembly from the.unenclosed configuration to the enclosed configuration when in the unextended configuration, the holding bracket comprising a rear portion that overlaps a portion of the support frame, a forward portion connected to the end cap so that the rear portion of the holding bracket is interlocked with the support frame, and a protruding portion that extends outwardly from the support assembly when the holding bracket is in the extended configuration so the protruding portion is available to be clamped by a clamping device that does not substantially interfere with servicing the optical fibers.

6. A closure for containing optical fibers comprising:

a housing defining an internal cavity;

a support assembly operative for supporting the optical fibers, the support assembly contained in the cavity to provide an enclosed configuration and removed from the cavity to provide an unenclosed configuration; and a holding bracket for securely holding the support assembly, the holding bracket comprising:

a forward connecting mechanism that is operative for connecting to a forward portion of the support assembly, a rear connecting mechanism that is spaced apart from the forward connecting mechanism and operative for connecting to a rearward portion of the support assembly, and a protruding portion, wherein the holding bracket is removably connectable to the support assembly to provide an extended configuration in which the protruding portion extends away from the support assembly and is available to be clamped by a clamping device that does not substantially interfere with servicing the optical fibers.

7. A closure for containing optical fiber splices and that can be efficiently serviced through the use of a clamping device, the closure comprising:

a housing defining an internal cavity and an opening to the internal cavity;

a support assembly operative for supporting the optical fiber splices, wherein a substantial portion of the support assembly is capable of being contained in the cavity to provide an enclosed configuration, and the support assembly is further capable of being removed from the cavity to provide an unenclosed configuration, the support assembly comprising and end cap and a support frame that is connected to and extends from the end cap, wherein the end cap occludes the opening of the housing and the support frame is positioned in the internal cavity while the closure is in the enclosed configuration; and a holding bracket comprising and elongate member that is pivotally connected to the support frame of the support assembly and operative for pivoting between an extended configuration and an unextended configuration, wherein the holding bracket is substantially aligned with the support frame in the unextended configuration and the extended configuration and is arranged so as not to interfere with movement of the support assembly from the unenclosed configuration to the enclosed configuration while the holding bracket is in the unextended configuration, and the bracket comprises a protruding portion that extends outwardly from the support assembly while the holding bracket is in the extended configuration so the protruding portion is available to be champed by the clamping device, whereby the clamping device does not substantially interfere with the servicing of the optical fiber splices.

8. A closure according to claim 7, further comprising an elongate fastener wrapped around at least a portion of the support assembly and the holding bracket to at least partially connect the holding bracket to the support assembly.

9. A closure according to claim 7, wherein the holding bracket is connected to the support frame at a position that is proximate to the end cap while the holding bracket is in the extended configuration and the holding bracket is connected to the support frame at a position that is distant from the end cap while the holding bracket is in the unextended configuration.

10. A closure according to claim 9, further comprising:
a stud connected to the support frame at a position that is distant from the end cap; and
a flange connected to the support frame at a position that is proximate to the end cap,
wherein the holding bracket defines an aperture that receives the stud to at least partly facilitate the connecting of the holding bracket to the support frame during the unextended configuration of the holding bracket, and the holding bracket engages the flange of the support frame to at least partly facilitate the connecting of the holding bracket to the support frame during the extended configuration of the holding bracket.

11. A closure according to claim 7, further comprising:
a tray operative for containing the optical fiber splices; and
a connector that holds the tray to the support assembly, wherein the connector also holds the holding bracket to the support assembly while the holding bracket is in the unextended configuration.

12. A closure according to claim 11, wherein the connector comprises a strap.

13. A closure according to claim 11, wherein the connector comprises a stud that is connected to and extends from the support assembly, and the holding bracket defines an aperture through which the stud extends while the holding bracket is in the unextended configuration.

14. A closure according to claim 7, wherein the holding bracket comprises:
a base portion having opposite front and rear ends, wherein the base portion extends in a longitudinal direction between the front and rear ends, and the base portion comprises opposite first and second edges that extend in the longitudinal direction;
a first rear flange connected to the base portion proximate to the first edge and the rear end, and extending away from the base portion in a first direction;
a second rear flange connected to the base portion proximate to the second edge and the rear end, and extending away from the base portion in the first direction; and
a front flange connected to be base portion at a position that is forward of the rear flanges, wherein the front flange extends away from the base portion in the first direction.

15. A closure according to claim 14, wherein:
the end cap of the support assembly has a front end and a rear end; and
the support frame of the support assembly extends rearward of the end cap and comprises:
opposite first and second sides that extend in the longitudinal direction,
a first lateral flange that is connected to and extends laterally away from the first side of the support frame, and
a second lateral flange that is connected to and extends laterally away from the second side of the support frame; and
while the holding bracket is in the extended configuration, the base portion of the holding bracket is proximate to the support frame, the first rear flange of the holding bracket is proximate to the first side of the support frame and engaged to the first lateral flange of the support assembly, the second rear flange of the holding bracket is proximate to the second side of the support frame and engaged to the second lateral flange of the support assembly, and the front flange of the holding bracket is engaged to the front end of the end cap.

16. A closure for containing optical fiber splices and that can be efficiently serviced through the use of a clamping device, the closure comprising:
a housing defining an internal cavity;
a support assembly operative for supporting the optical fiber splices, wherein a substantial portion of the support assembly is capable of being contained in the cavity to provide an enclosed configuration, and the support assembly is further capable of being removed from the cavity to provide an unenclosed configuration; and
a holding bracket for securely holding the support assembly, the holding bracket comprising:
a forward connecting mechanism that is operative for connecting to a forward portion of the support assembly,
a rear connecting mechanism that is spaced apart from the forward connecting mechanism and operative for connecting to a rearward portion of the support assembly, and
a protruding portion,
wherein the holding bracket is removably connectable to the support assembly to provide an extended configuration in which the protruding portion of the holding bracket extends away from the support frame so the protruding portion is available to be clamped by the clamping device, whereby the clamping device does not substantially interfere in the servicing of the optical fiber splices when the clamping device is clamped to the protruding portion during the extended configuration.

17. A closure according to claim 16, wherein:
the housing further defines an opening to the cavity;
the support assembly comprises:
an end cap having opposite front and rear ends, wherein the end cap occludes the opening of the housing while the closure is in an enclosed configuration and the end cap is removed from the opening of the housing while the closure is in an unenclosed configuration, and
a support frame connected to the end cap and extending rearward from the end cap, wherein the support frame is contained in the cavity while the closure in is the enclosed configuration and the support frame is outside of the cavity while the closure is in the unenclosed configuration;
the forward connecting mechanism of the holding bracket is operative for connecting to the end cap, and
the rear connecting mechanism of the holding bracket is operative for connecting to the support frame.

18. A closure according to claim 17, wherein the rear connecting mechanism of the holding bracket comprises a flange that is operative to engage the support frame.

19. A closure according to claim 17, wherein:
the support frame has opposite front and rear ends, and the support frame extends in a longitudinal direction therebetween;
the support frame comprises:
a forward frame section that comprises opposite first and second sides that extend in the longitudinal direction,
a first lateral flange that is connected to and extends laterally away from the first side of the forward frame section, and a second lateral flange that is connected to and extends laterally away from the second side of the forward frame section;

the holding bracket comprises a base portion that extends in the longitudinal direction and is proximate to the forward frame section; and the rear connecting mechanism of the holding bracket comprises:

a first connecting flange that extends from the base portion, is proximate to the first side of the forward frame section, and engages the first lateral flange; and a second connecting flange that extends from the base portion, is proximate to the second side of the forward frame section, and engages the second lateral flange.

20. A closure according to claim 17, wherein the support frame comprises a flange to which the rear connecting mechanism is connected.

21. A closure according to claim 20, wherein the flange of the support frame has a strain-relief bracket connected thereto.

22. A closure according to claim 17, wherein the forward connecting mechanism of the holding bracket comprises a threaded fastener that is operative to fasten the holding bracket to the end cap.

23. A closure according to claim 17, wherein the forward connecting mechanism of the holding bracket comprises a flange that is engaged to the end cap.

24. A closure according to claim 23, wherein the flange is engaged to the front end of the end cap.

25. A closure according to claim 23, wherein:

the flange defines an aperture therethrough; and the forward connecting mechanism further comprises a threaded fastener that extends through the aperture and into the end cap.

26. A bracket for removably connecting to and holding an internal component of a closure for containing optical fiber splices, the bracket comprising:

a base portion having opposite front and rear ends, wherein the base portion extends in a longitudinal direction between the front and rear ends, and the base portion comprises opposite first and second edges that extend in the longitudinal direction;

a first rear flange connected to the base portion proximate to the first edge and the rear end, and extending away from the base portion in a first direction;

a second rear flange connected to the base portion proximate to the second edge and the rear end, and extending away from the base portion in the first direction; and a forward connecting mechanism that is positioned forward of the rear flanges.

27. A bracket according to claim 26, wherein the base portion defines an aperture therethrough that serves as the forward connecting mechanism.

28. A bracket according to claim 26, wherein the base portion defines a forward aperture therethrough that is proximate to the front end, and the base portion further defines a rear aperture therethrough that is proximate to the rear end.

29. A bracket according to claim 26, wherein the forward connecting mechanism comprises a forward flange connected to the base portion at a position that is forward of the rear flanges, and the front flange extends away from the base portion in the first direction.

30. A bracket according to claim 29, wherein:

the first rear flange defines an aperture that is open at the rear end of the first rear flange;

the second rear flange defines an aperture that is open at the rear end of the second rear flange; and the front flange defines an aperture therethrough.

* * * * *